United States Patent
Allison et al.

(10) Patent No.: US 7,607,351 B2
(45) Date of Patent: Oct. 27, 2009

(54) ACOUSTIC IMPACT DETECTION AND MONITORING SYSTEM

(75) Inventors: Peter S. Allison, Conroe, TX (US); Charles E Chassaing, Raleigh, NC (US); Bryan Lethcoe, Houston, TX (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 11/819,214

(22) Filed: Jun. 26, 2007

(65) Prior Publication Data

US 2009/0000381 A1   Jan. 1, 2009

(51) Int. Cl.
*G01H 3/00* (2006.01)
*G01M 3/24* (2006.01)
*G01B 5/28* (2006.01)

(52) U.S. Cl. .................. 73/592; 73/40.5 A; 702/36; 702/51; 702/54

(58) Field of Classification Search .............. 73/592, 73/594, 40.5 A, 579, 596; 702/35–36, 50–54
See application file for complete search history.

(56) References Cited

U.S. PATENT DOCUMENTS

| | | | |
|---|---|---|---|
| 4,953,144 A | 8/1990 | Chin et al. | |
| 5,117,676 A | 6/1992 | Chang | |
| 5,272,646 A * | 12/1993 | Farmer | 702/51 |
| 5,416,724 A | 5/1995 | Savic | |
| 5,428,989 A * | 7/1995 | Jerde et al. | 73/40.5 R |
| 5,544,074 A | 8/1996 | Suzuki et al. | |
| 5,548,530 A * | 8/1996 | Baumoel | 702/51 |
| 5,557,258 A | 9/1996 | Eslambolchi | |
| 5,623,421 A | 4/1997 | Savic | |
| 5,650,943 A | 7/1997 | Powell et al. | |
| 5,675,506 A | 10/1997 | Savic | |
| 5,708,193 A | 1/1998 | Ledeen et al. | |
| 5,708,195 A | 1/1998 | Kurisu et al. | |
| 5,744,700 A | 4/1998 | Carme et al. | |
| 5,922,942 A | 7/1999 | Roy | |
| 5,974,862 A * | 11/1999 | Lander et al. | 73/40.5 A |
| 5,979,239 A | 11/1999 | Youngquist et al. | |
| 5,987,990 A * | 11/1999 | Worthington et al. | 73/592 |
| 6,082,193 A * | 7/2000 | Paulson | 73/152.58 |
| 6,138,512 A | 10/2000 | Roberts et al. | |
| 6,227,036 B1 | 5/2001 | Yonak et al. | |
| 6,389,881 B1 | 5/2002 | Yang et al. | |
| 6,404,343 B1 | 6/2002 | Andou et al. | |
| 6,442,999 B1 | 9/2002 | Baumoel | |
| 6,453,247 B1 | 9/2002 | Hunaidi | |
| 6,530,263 B1 * | 3/2003 | Chana | 73/40.5 R |
| 6,567,006 B1 | 5/2003 | Lander et al. | |

(Continued)

*Primary Examiner*—Helen C. Kwok
(74) *Attorney, Agent, or Firm*—Potomac Patent Group PLLC

(57) ABSTRACT

A system is disclosed for detecting and locating harmful impacts to pipelines using sensors placed along the pipeline. The exact spacing of sensors is site specific and is set with the goal of maximizing sensor spacing without reducing system performance and reliability. At each sensor location, preferably there are four basic components, i.e., a hydrophone, solar power components, and data processing and communications equipment. Each hydrophone directly measures the acoustic noise fluctuation in a pipe section, which propagates at long distances in the pipeline at the specific speed of sound for the particular type of pipe. If specific signal parameters exceed a programmed threshold, a detection message is generated and transmitted via a communications link to a central monitoring and diagnostic center.

24 Claims, 1 Drawing Sheet

U.S. PATENT DOCUMENTS

| | | |
|---|---|---|
| 6,595,038 B2 | 7/2003 | Williams et al. |
| 6,614,354 B2 | 9/2003 | Haines et al. |
| 6,626,042 B2 | 9/2003 | Havlena |
| 6,647,762 B1 | 11/2003 | Roy |
| 6,668,619 B2 * | 12/2003 | Yang et al. ............... 73/40.5 R |
| 6,725,705 B1 | 4/2004 | Huebler et al. |
| 6,785,618 B2 | 8/2004 | Kechter et al. |
| 6,820,016 B2 * | 11/2004 | Brown et al. .................. 702/51 |
| 6,957,157 B2 | 10/2005 | Lander |
| 6,965,320 B1 * | 11/2005 | Casey et al. ............ 340/870.07 |
| 2006/0225507 A1 * | 10/2006 | Paulson ....................... 73/592 |

* cited by examiner

ACOUSTIC IMPACT DETECTION AND MONITORING SYSTEM

BACKGROUND OF THE INVENTION

The present invention relates to pipelines, and more particularly, to a system for improving pipeline safety by detecting and locating third party impacts to a pipeline that may cause damage to the pipeline and informing operators about the third party impacts in a timely fashion.

Damage from third party impacts to pipelines is considered the number one cause of pipeline failures. Pipeline operators need to know about pipeline impact events in order to investigate and determine appropriate responses to such events. With real time knowledge of such an event, a pipeline operator is more likely to be able to reach the site of the damage before the third party has left and is more likely to recover damages from the third party. Such knowledge also enables operators to effect timely repairs to any damage that, if left untreated, could lead to future failures with potentially much greater financial, safety and environmental consequences.

Impact detection methods, such as periodic surveying of pipelines, generally need to be carried out too often, or are too costly to retrofit to provide a truly effective means to safeguard against third party impacts. While many solutions have been developed for leak detection, no one has tried to provide a self contained, real time impact detection system that that does not require landline or cell connectivity for communication.

BRIEF DESCRIPTION OF THE INVENTION

The present invention provides a more cost effective solution using real-time 24×7 monitoring of the entire pipeline length and with sensor spacing optimized for the specific pipeline.

A sufficiently large impact from an excavator, a drill, or other object on the pipeline, or an explosion or ground disturbance creates an impact that generates an acoustic shock in the pipeline. Typically, the shock propagates in the fluid within the pipe for considerable distances in both buried and non-buried pipelines. The shock attenuation along the sound path depends on the fluid, the pipeline geometry, the pipeline environment, and the frequency spectrum of the impact. The duration and spectral content of the signal depend on the shock itself and how it was created. At any point along the sound path, the shock creates a traveling pressure fluctuation that can be measured by acoustic sensors installed on the pipeline.

The system of the present invention allows the rapid detection of third party damage to a pipeline through a series of acoustic sensors which are proprietary hydrophones, and which attach easily to pipeline facilities without the need for tapping. The hydrophones directly measure the acoustic noise fluctuation in the pipeline, which propagates at long distances in the pipeline at the product specific speed of sound. The system also uses local signal processing and communications infrastructure to communicate the occurrence of third party impact events to a central monitoring location.

The hydrophones are placed preferably about 5-20 km apart along the pipeline. The exact spacing is site specific and is set with the goal of maximizing sensor spacing without reducing system performance and reliability. Monitoring an extended length of pipeline requires self sufficient power and global connectivity to transmit event messages from remote locations.

At each sensor location, there are preferably four basic components. They include a hydrophone, solar power components, communications and equipment housing. Each component is designed to perform in a wide spectrum of operating environments.

A series of data acquisition, processing, and communications modules are used with the series of hydrophones. Each module collects the data from one of the hydrophones and processes it using dedicated algorithms programmed into an internal signal processor. These algorithms compute the Fast Fourier Transform ("FFT") of the signal in real time and look for changes in energy in the current signal versus the previous background. Each module also includes a satellite modem for near real time communication with a central monitoring and diagnostic center, as well as the capability to synchronize to GPS (Global Positioning System) time. The module can be integrated to solar power to allow for remote operation. It also preferably uses satellite communications so it can be placed in regions that do not have wireless service. It should be noted, however, that wireless or land communications can also be used, rather than satellite communications, in areas where such wireless or land service is available.

The signal processing module is capable of real time frequency discrimination to eliminate false alarms from non-threat acoustic sources. With an appropriate data processing technique, the noise generated by a third party impact is extracted from the global ambient noise in a pipeline. To this end, the signal processing module can be programmed to use one or more of the following signal treatments to extract the noise generated by the third part impact: (1) bandpass filtering with programmable upper and lower frequency limits, (2) minimum and maximum duration constraints, (3) thresholding, and (4) hydrophone sensitivity and signal gain adjustment.

If specific signal parameters exceed a programmed threshold, a detection message is generated and transmitted via satellite communications to the central monitoring and diagnostic center located at a remote site. Detection messages from multiple sensors are processed at the remote center to validate and localize the impact event and generate an event alarm, if appropriate. Accurate impact localization requires the shock to be detected by two sensors located on opposite sides of the impact.

If the sound velocity of a pipeline product and the exact distance between the sensors are known, the impact location can be accurately computed. The localization accuracy primarily depends on three factors: (1) accuracy of the speed of sound (which can be measured or calculated); (2) accuracy of the linear distance between sensors; and (3) accuracy of the time measurement. This is directly dependent on GPS time synchronization between the various sensor stations.

A typical accuracy for locating an impact is about 1% of the distance between sensors. The biggest single contributor to localization error is sound velocity. Significant variation in the sound velocity will increase the localization error. The largest localization error is near a hydrophone. The localization error decreases as the impact moves to the region between sensors.

The historical data mining enabled by the present invention also enables ongoing incident trending and risk assessment to establish mitigation strategies to limit the likelihood of reoccurrence of third party impacts to pipelines and put a stop to repeat offenders causing such impacts.

DETAILED DESCRIPTION OF THE INVENTION

Figure 1:
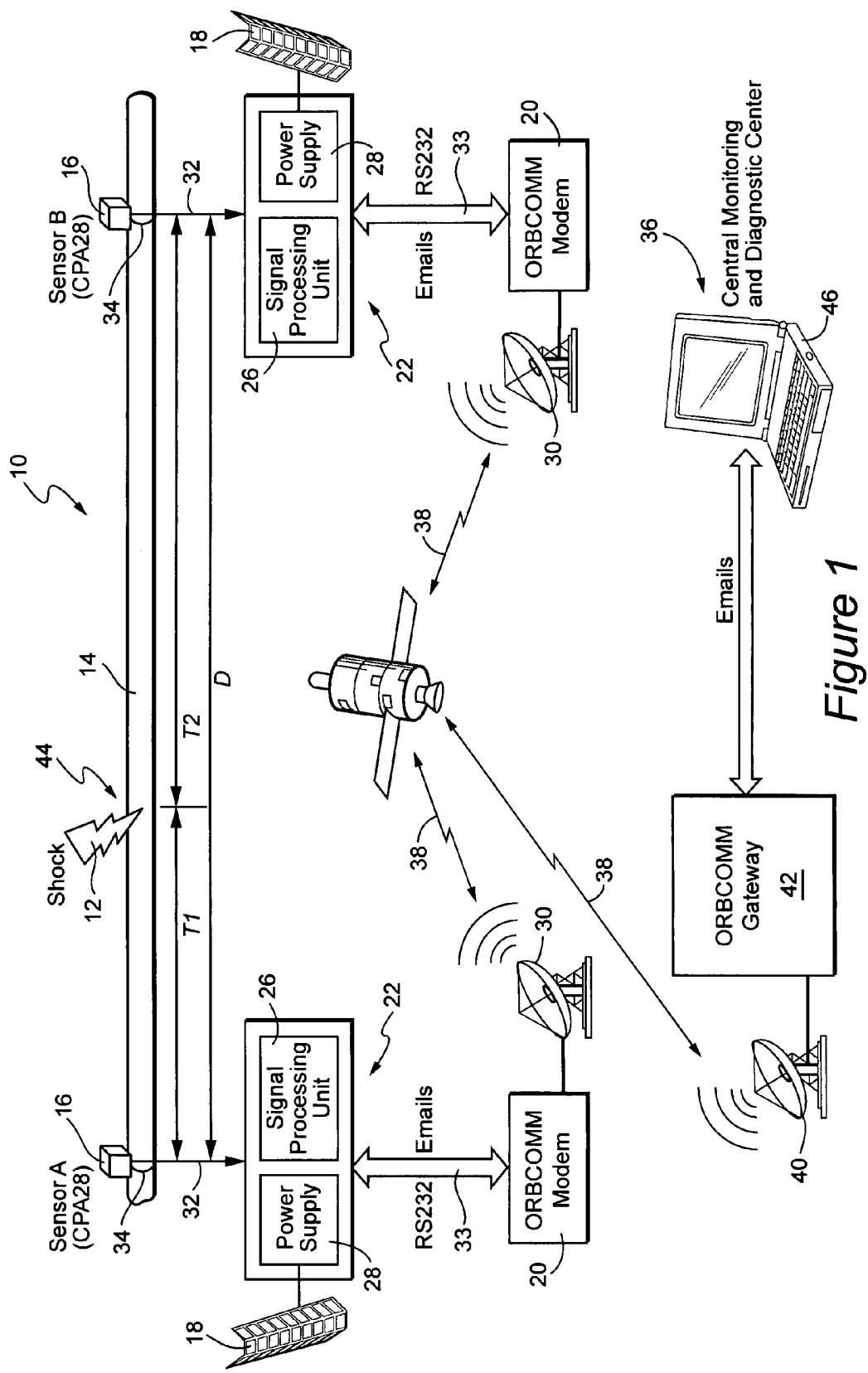
FIG. 1 is a schematic drawing showing the components of one embodiment of the pipeline monitoring system of the present invention.

FIG. 1 is a schematic drawing showing an overview of one embodiment of a monitoring system 10 according to the present invention for detecting and locating third party shocks or impacts 12 to a pipeline 14. The system 10 detects and locates such impacts 12 through a series of hydrophone sensors 16, which are attached to pipeline 14 without the need for tapping.

At each sensor location, there are four basic components. They include a hydrophone sensor 16, power elements 18, communications equipment 20 and a corresponding sensor station 22. Each component is designed to perform in a wide spectrum of operating environments.

Preferably, the system 10 includes a hydrophone sensor 16 and a corresponding sensor station 22 at each of a series of locations along the pipeline 14. The spacing of each hydrophone 16 and corresponding sensor station 22 is selected to maximize sensor spacing without reducing system performance and reliability. Preferably, each sensor station 22 consists of a signal processing unit 26, a power supply unit 28, the communications equipment 20, communication and GPS antennas 30, and interconnecting cabling 32. The sensor station equipment may be mounted on a frame supplied specifically for the mounting of the station, mounted in an enclosure, or customized to mount on existing equipment at each site location.

Each hydrophone 16 is preferably installed on a fixture 34 connected to the main pipeline. This fixture 34 can be one provided specifically for the mounting of the hydrophone to the pipeline. Each hydrophone 16 is connected with its corresponding sensor station 22 by a cable 32 of a specified length depending on the hydrophone's position on the pipeline and the location of its corresponding sensor station. Preferably, the cable 32 is run in appropriate cable trays or conduits.

Preferably, each hydrophone 16 is a CPA28-type hydrophone. The CPA28 hydrophone is supplied with a 1-inch ANSI Class 600 raised face flange and a dedicated protected cable. The CPA28 hydrophone directly measures the acoustic noise fluctuation in the pipeline 14, which propagates at long distances in the pipeline at the natural gas speed of sound approximately 400 m/s. It should be noted that the CPA28 is reliable sensor that does not require any maintenance. For example, 31 CPA28 units have been in test on an ethylene pipe at 90 Bar for more than 3 years without a single problem.

A CPA28-type hydrophone has the following specifications:

| Characteristics CPA28 | Specifications | Comments |
|---|---|---|
| Sensibility | 0.2 or 10 mV/Pa | Adjustable |
| Operating Temperature | −40 to +85° C. | |
| Standard Interface | ANSI Class 600# 1" Flange | Threaded male 1" NPT |
| Operating pressure | 120 Bar | available as an option |
| Size | Diameter: 125 mm, Length: 200 mm | |
| Material | Stainless steel 316 | |
| Weight | 3.7 kg | |
| Cable length | <300 m | |
| Certification ATEX | Eex ia IIC T6 (−20° C. to +40° C.) and Eex ia IIC T4 (−40° C. to +80° C.) | |
| CEM Certification | Industrial | |
| Protection | IP67 | |

Each sensor station 22 is equipped with a satellite modem 20 and antenna 30 for communication between the sensor station's signal processing unit 26 and a Central Monitoring and Diagnostic Center 36. This arrangement provides near real time notification of acoustic events in the pipeline 14 to the Central Monitoring and Diagnostic Center 36.

The sensor station's signal processing unit 26 can be programmed to use one or more of the following signal treatments:

Minimum and maximum duration constraints,

Statistical Thresholding where the threshold varies by frequency band according to the ambient background noise level and the increase required to trigger a detection is a function of the background variance, and/or Hydrophone sensitivity and signal gain adjustment.

If specific signal parameters measured from data collected by a hydrophone 16 exceed a programmed threshold, a detection message is generated by the signal processing unit 26 and transmitted to the central monitoring and diagnostic center 36 via the sensor station's communications link. Detection messages from multiple sensors are processed at the remote central monitoring and diagnostic center 36 to validate and localize the third party impact and generate an impact alarm, if appropriate. Accurate impact localization requires an impact or shock 12 to be detected by two sensors 16 located on opposite sides of the impact 12.

If the sound velocity of a particular type of pipeline product and the exact distance between the sensors 16 on opposite sides of an impact 12 are known, the impact location can be accurately computed with the following formula:

$$d=[D(c-u)-\Delta t(c^2-u^2)]/2c$$

where:
d=distance of impact from the nearest sensor,
D=overall distance between sensors,
c=sound velocity of fluid inside the pipeline,
u=bulk flow velocity of pipeline fluid, and
$\Delta t$=transit time difference for the shock to reach sensors=T2−T1.

The localization accuracy for impacts primarily depends on three factors:
accuracy of the speed of sound (which can be measured or calculated),
accuracy of the linear distance between sensors, and
accuracy of the time measurement.

This latter factor is directly dependent on the GPS time synchronization between the various sensor stations.

A typical accuracy for locating impacts is about 1% of the distance between sensors. The biggest single contributor to localization error is sound velocity. Significant variation in the sound velocity will increase the localization error. The largest localization error is near a hydrophone 16. The localization error decreases as an impact moves to the region between the hydrophone sensors 16.

Multiple sensors 16 are used to monitor an extended length of pipeline 14. In this situation a typical distance between sensors 16 is about 15 Km. When a shock 12 is localized, an operator can send a team to the impact zone to assess the cause and extent of the damage.

Each sensor station 22 is a data acquisition, processing, and communications module. It collects the data from a corresponding hydrophone sensor 16 and processes it using dedicated algorithms programmed into the internal signal processing unit 26.

Each sensor station 22 also includes a satellite modem 20 for near real time communication with the Central Monitoring and Diagnostic Center 36, as well as GPS (Global Positioning System) capabilities for time synchronisation.

Each sensor station includes:
Sensors signal conditioning,
Signal acquisition and A/D conversion,
Signal processing,
Storage,
Alarm generation,
Event dating,
Alarm and message transmission to the Central Monitoring and Diagnostic Center, and
Signal transmission to the Central Monitoring and Diagnostic Center.

Power for the pipeline monitoring system 10 of the present invention is provided either through electricity provided by a pipeline owner or through solar panels 18 provided specifically for use with the system. The owner-supplied electricity can be from a municipal source or otherwise. In either case, the system includes a battery power unit 28 in case of a power failure.

The hard-wired electrical power can be either 110v or 220v. Preferably, the wiring lead for the electrical source is either buried and/or protected via conduit piping.

The solar panels 18 are preferably two 100 W solar panels for powering the system sensor stations. Typically, the panels are installed and connected to sensor stations as part of the installation of system 10. The solar panels 18 are typically used in remote locations where municipal power sources are unavailable. Preferably, the solar panels will have the following specifications:

| GEPV-100 | Specifications |
| --- | --- |
| Size | 661 × 1477 × 55 mm |
| Weight | 11.9 Kg |
| Power output (peak) | 100 W @ 16.1 V |
| Weight (wind) bearing potential | 50 lbs/ft² (125 mph equivalent) |
| Hailstone Impact Resistance | 1" @ 50 mph (25 mm @ 80 kph) |
| Operating temperature | −45° C. |

Preferably, the battery power is derived from two 12V battery units, which are preferably Deka 45HR2000S units. These types of batteries typically provide power for up to five days without recharging. They are of sealed lead acid (SLA) chemistry, and therefore do not require routine maintenance. Preferably, each battery unit will have the following specifications:

| 45HR2000S | Specifications |
| --- | --- |
| Size | 8.84 × 5.31 × 8.71 inches |
| Weight | 38.5 lbs |
| Amperes | 55 per hour |
| Volts | 12 |

Bidirectional communications between each sensor station 22 and the Central Monitoring and Diagnostic Center 36 is preferably provided by Low Earth Orbit (LEO) Satellite Link 38 that includes a satellite antenna 40 and gateway communications equipment 42 for the central center 36. However, as noted above, where available, wireless or land communications systems could be used. Each sensor station 22 is equipped with a satellite modem 20 and satellite communications antenna 30, optimized to provide near real time communications capability. The modem 20 is preferably connected to the signal processing unit 26 of the sensor station 22 through an RS232 connection 33.

The unique strength of the pipeline monitoring system 10 of the present invention is the use of a Central Monitoring and Diagnostic Center 36 that is staffed with trained engineers and technicians to continuously monitored for impacts. Should an impact occur, the technicians and engineers can quickly and accurately assess each situation, eliminating false alarms and identifying immediate threats with verified notifications sent within a time period as short as 30 minutes.

| Parameter | Specification | Comment |
| --- | --- | --- |
| Impact | Impact > 2000 Joules | |
| Localization accuracy | <1% of distance between sensors or | Assumes sound velocity known within ±1% & distance within ±1 m |
| Confirmation and Localization time | <30 min | |

False alarms are minimized with software logic run on a computer system 46 located at the Central Monitoring and Diagnostic Center 36. This logic ensures the amplitude of the shock 12 received by each hydrophone 16 is consistent with the determined location 44.

During pigging, the following steps must be taken to ensure pigging sounds are not erroneously classified as impacts:
The operator provides the monitoring center with the window in which pigging will be occurring.
In the segment where the pig is located, impact detection is suspended because the pig stops wave propagation. Impact detection & localization remain possible in all the other sections of the pipeline.
The operator informs the monitoring center when the pigging operation is completed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for detecting and locating impacts to a pipeline, the system comprising:
    a plurality of sensors attached to the pipeline along a length of the pipeline,
    a plurality of sensor stations positioned along the length of the pipeline, each sensor station corresponding to one of the plurality of sensors,
    a monitoring station remote from the plurality of sensors and sensor stations, and
    a bidirectional communications link between the remote monitoring station and each of the sensor stations,
    each of the sensor stations performing data acquisition and signal processing functions for collecting data from the corresponding sensor and processing the data to autonomously determine whether the pipeline has been impacted and the time at which the impact occurred,
    each of the sensor stations being programmed to autonomously vary its detection threshold for determining that the pipeline has been impacted.

2. The system of claim 1, wherein each of the sensors is a hydrophone that measures acoustic signals indicative of pressure fluctuations in the pipeline.

3. The system of claim 1, wherein each of the sensors is positioned along the length of the pipeline so as to maximize sensor spacing without reducing the performance capability and reliability of the monitoring system.

4. The system of claim 3, wherein the sensors are hydrophones placed about 15 km apart along the length of the pipeline.

5. The system of claim 1, wherein each of the sensor stations includes a data acquisition module for receiving data from the corresponding sensor, a data processing module for processing the data received from the corresponding sensor to determine whether an impact has occurred on the pipeline, and a communications module for communicating the impact determination to a remote monitoring center.

6. The system of claim 5, wherein the data processing module performs real time frequency discrimination to eliminate impact false alarms from non-threat acoustic sources.

7. The system of claim 5, wherein the data processing module uses a data processing technique to extract noise generated by a pipeline impact from global ambient noise in the pipeline.

8. The system of claim 7, wherein the data processing technique is a signal treatment technique that includes at least one of minimum and maximum duration constraints, frequency sensitive thresholding, and sensor sensitivity and signal gain adjustment.

9. The system of claim 5, wherein the signal processing module determines if a root mean square ("RMS") amplitude of a processed data signal exceeds an autonomously determined threshold by a statistically significant amount, and, if so, wherein the communications module generates an impact detection message and transmits the message via the communications link to the remote monitoring station.

10. The system of claim 5, wherein a degree of confidence associated with a hypothesis that measured acoustic signals exceeds a predetermined threshold is specified in advance by a program setting.

11. The system of claim 9, wherein the remote monitoring station processes detection messages from multiple sensor stations to validate and localize an impact event and generate an event alarm.

12. The system of claim 11, wherein accurate localization of an impact is detected by two sensors located on opposite sides of the impact, and wherein a strike location is computed according to the formula $d=[D(c-u)-\Delta t(c^2-u^2)]/2c$, where "d" is a distance of impact from a sensor nearest to the impact, "D" is an overall distance between two sensors on opposite sides of the impact, "c" is the velocity of sound inside the pipeline, "u" is the bulk flow velocity of the fluid in the pipe, and "$\Delta t$" is a transit time difference for the impact shock to reach the sensors on opposite sides of the impact.

13. The system of claim 5, wherein each communications module includes a satellite modem for near real time communication with the remote monitoring center and to synchronize to Global Positioning System time.

14. The system of claim 1, further comprising at least one solar panel for providing power to the sensor station and the corresponding sensor.

15. The system of claim 1, wherein each sensor is a hydrophone installed on a fixture connected to the pipeline without tapping into the pipeline.

16. The system of claim 1, wherein the bidirectional communications link includes for each sensor station a satellite modem and antenna for communication with a low earth orbit satellite.

17. The system of claim 1, wherein the remote monitoring station performs both monitoring and diagnostic functions to continuously monitor the occurrence of pipeline impacts, identify threats to the pipeline and eliminate false alarms.

18. A system for detecting and locating strikes to a pipeline, the system comprising:
    a plurality of sensors attached to the pipeline along a length of the pipeline, each of the sensors measuring acoustic noise fluctuation in the pipeline,
    a plurality of sensor stations positioned along the length of the pipeline, each sensor station being linked to a corresponding one of the plurality of sensors, each of the sensor stations collecting data from the corresponding sensor and processing the data collected from the corresponding sensor to autonomously determine whether the pipeline has been impacted and the time at which the impact occurred, each of the sensor stations being programmable to vary its detection threshold for determining that the pipeline has been impacted,
    a monitoring and diagnostic center remote from the plurality of sensors and sensor stations, and
    a bidirectional communications link between the remote monitoring and diagnostic center and each of the sensor stations,
    the monitoring and diagnostic center monitoring communications from the plurality of sensor stations for detecting pipeline strikes and calculating a position of the detected pipeline strikes that are determined to present a threat to the pipeline.

19. The system of claim 18, wherein each of the sensors is a hydrophone positioned along the length of the pipeline so as to maximize sensor spacing without reducing system performance capability and reliability, and wherein the data processing performed by each sensor station uses a data processing technique to extract noise generated by a pipeline strike from ambient noise in the pipeline.

20. The system of claim 19, wherein the remote monitoring and diagnostic center uses strike data received from two sensors located on opposite sides of a strike to determine a location of the strike, the monitoring and diagnostic center using a time difference for the strike shock to reach the two sensors on opposite sides of the strike to determine the distance of the strike from the sensor nearest to the strike.

21. A system for detecting and locating impacts to a pipeline, the system comprising:
- a plurality of hydrophones attached to the pipeline along a length of the pipeline, each of the hydrophones measuring acoustic noise fluctuation in the pipeline,
- a plurality of sensor stations positioned along the length of the pipeline, each sensor station being linked to a corresponding one of the plurality of hydrophones, each of the sensor stations including a communications module and data acquisition and processing modules to autonomously determine whether the pipeline has been impacted and the time at which the impact occurred, each of the processing modules being programmed to autonomously vary its detection threshold for determining that the pipeline has been impacted,
- a remote monitoring and diagnostic center for receiving communications from the plurality of sensor stations indicating that the pipeline has been impacted, and
- a bidirectional communications link between the remote monitoring and diagnostic center and each of the sensor stations, the bidirectional communications link including a low earth orbit satellite link,
- the remote monitoring and diagnostic center determining whether the communications from the plurality of sensor stations indicating pipeline impacts are false alarms, and if not, calculating a position of a detected pipeline impact.

22. The system of claim 21, wherein each processing module processes the data from one of the corresponding sensors using dedicated algorithms that compute a Fast Fourier Transform ("FFT") of the data in real time and look for changes in energy in the current data versus the previous background.

23. The system of claim 1, wherein each sensor station is programmed to vary its detection threshold in response to variations in the background noise level in the pipe.

24. The system of claim 21, wherein each of the processing modules is programmed to autonomously vary its detection threshold in response to variations in the background noise level in the pipe.

* * * * *